(12) United States Patent
Jiang et al.

(10) Patent No.: US 11,698,730 B2
(45) Date of Patent: Jul. 11, 2023

(54) DATA STORAGE METHOD, APPARATUS, AND DEVICE, AND READABLE STORAGE MEDIUM

(71) Applicant: INSPUR ELECTRONIC INFORMATION INDUSTRY CO., LTD., Shandong (CN)

(72) Inventors: Dongdong Jiang, Shandong (CN); Yaqian Zhao, Shandong (CN); Gang Dong, Shandong (CN); Rengang Li, Shandong (CN); Haiwei Liu, Shandong (CN); Hongbin Yang, Shandong (CN); Chen Li, Shandong (CN)

(73) Assignee: INSPUR ELECTRONIC INFORMATION INDUSTRY CO., LTD., Shandong (CN)

( * ) Notice: Subject to any disclaimer, the term of this patent is extended or adjusted under 35 U.S.C. 154(b) by 0 days.

(21) Appl. No.: 17/927,716

(22) PCT Filed: Jan. 22, 2021

(86) PCT No.: PCT/CN2021/073323
§ 371 (c)(1),
(2) Date: Nov. 24, 2022

(87) PCT Pub. No.: WO2021/238249
PCT Pub. Date: Dec. 2, 2021

(65) Prior Publication Data
US 2023/0133665 A1    May 4, 2023

(30) Foreign Application Priority Data
May 28, 2020 (CN) .......................... 202010469856.9

(51) Int. Cl.
*G06F 3/06* (2006.01)
*G06F 21/60* (2013.01)

(52) U.S. Cl.
CPC .......... *G06F 3/0623* (2013.01); *G06F 3/0634* (2013.01); *G06F 3/0673* (2013.01); *G06F 21/604* (2013.01)

(58) Field of Classification Search
CPC .... G06F 3/0623; G06F 3/0634; G06F 3/0673; G06F 21/604
(Continued)

(56) References Cited

U.S. PATENT DOCUMENTS 6,064,605 A * 5/2000 Muranaka ............. G11C 11/406
365/189.08
8,861,283 B1 * 10/2014 Wong .................... G11C 11/419
365/185.21
(Continued)

FOREIGN PATENT DOCUMENTS

| CA | 2053261 A1 * | 9/1936 |
| CN | 103268294 A | 8/2013 |

(Continued)

OTHER PUBLICATIONS

PCT/CN2021/073323 international search report.

*Primary Examiner* — Michael T Tran
(74) *Attorney, Agent, or Firm* — IPro, PLLC

(57) ABSTRACT

A data storage method, apparatus, and device, and a readable storage medium. The method includes: after a random access memory is powered on, obtaining target data to be stored in a fixed storage address of the random access memory; determining a target transmission mode from a bit value change transmission mode and a bit value fixed transmission mode, wherein the target transmission mode is different from a historical transmission mode determined after the random access memory is powered on last time; and transmitting the target data from and to the random access memory according to the target transmission mode. The (Continued)

method can prevent data from being stolen after power-down of the target data, and guarantees the data security.

17 Claims, 7 Drawing Sheets

(58) Field of Classification Search
USPC .............................................. 365/205, 189.05
See application file for complete search history.

(56) References Cited

U.S. PATENT DOCUMENTS

| | | |
|---|---|---|
| 2009/0138655 A1 | 5/2009 | Cho |
| 2016/0188408 A1* | 6/2016 | Anderson ........... G06F 11/1048 714/764 |

FOREIGN PATENT DOCUMENTS

| | | | | |
|---|---|---|---|---|
| CN | 104166523 A | | 11/2014 | |
| CN | 105580083 A | * | 5/2016 | ........... G11C 11/005 |
| CN | 110895477 A | | 3/2020 | |
| CN | 110943913 A | * | 3/2020 | |
| CN | 111722799 A | | 9/2020 | |
| CN | 112036196 A | * | 12/2020 | |
| JP | 2020049249 A | * | 4/2020 | ........... G06F 3/0601 |

\* cited by examiner

DATA STORAGE METHOD, APPARATUS, AND DEVICE, AND READABLE STORAGE MEDIUM

CROSS-REFERENCE TO RELATED APPLICATION

The present disclosure claims the priority of the Chinese patent application filed on May 28, 2020 before the CNIPA, China National Intellectual Property Administration with the application number of 202010469856.9 and the title of "DATA STORAGE METHOD, APPARATUS, AND DEVICE, AND READABLE STORAGE MEDIUM", which is incorporated herein in its entirety by reference.

FIELD

The present disclosure relates to the technical field of storage and, more particularly, to a data storage method, apparatus and device, and a readable storage medium.

BACKGROUND

After a random access memory is in powered failure, generally, data may be lost according to the characteristic of volatility, and there is no risk that the data is stolen.

However, after data stored in a certain segment of fixed address space of the random access memory is operated for thousands of hours, the system characteristic of the random access memory may be inclined to remember electrical level values of these data. In other words, if the random access memory is not operated by a Central Processing Unit (CPU), it is easy to change the random access memory to the original state of long-term storage under the influence from an electrical design principle of the random access memory even if the random access memory is powered on after power-down. Therefore, there is a risk that the changeless data stored in the random access memory for a long time is stolen, and a security risk is caused.

When the data stored in the random access memory is crucial, great loss may be brought. For example, when model parameters of a deep learning model are stored, the entire deep learning model may be stolen.

In conclusion, how to effectively eliminate the problem such as memory characteristics of the random access memory has been a technical problem to be urgently solved by the skilled in the art at present.

SUMMARY

Objectives of the present disclosure are to provide a data storage method, apparatus and device, and a readable storage medium. By changing a bit value of data stored in a random access memory, memory characteristics of the random access memory may be eliminated, the risk that the data is stolen is avoided, and the data security may be guaranteed.

In order to solve the above-mentioned technical problems, the present disclosure provides the following technical solutions.

Provided is a data storage method, including:

after a random access memory is powered on, acquiring target data to be stored in a fixed storage address in the random access memory;

determining a target transmission mode from a bit value change transmission mode and a bit value fixed transmission mode; the target transmission mode being different from a historical transmission mode determined after the random access memory is powered on last time; and transmitting the target data from and to the random access memory according to the target transmission mode.

In an embodiment of the present disclosure, when the target transmission mode is the bit value change transmission mode, the step of transmitting the target data from and to the random access memory according to the target transmission mode includes:

performing bit flipping on a bit value of the target data to obtain a flipped bit stream corresponding to the target data;

transmitting the flipped bit stream to the random access memory;

reading the flipped bit stream from the random access memory; and performing bit flipping on the flipped bit stream to obtain the target data.

In an embodiment of the present disclosure, when the target transmission mode is the bit value change transmission mode, the step of transmitting the target data from and to the random access memory according to the target transmission mode includes:

performing shift processing on the bit stream of the target data to obtain a shifted bit stream corresponding to the target data;

transmitting the shifted bit stream to the random access memory;

reading the shifted bit stream from the random access memory; and performing shift recovery on the shifted bit stream to obtain the target data.

In an embodiment of the present disclosure, when the target transmission mode is the bit value fixed transmission mode, the step of transmitting the target data from and to the random access memory according to the target transmission mode includes:

transmitting the bit stream of the target data to the random access memory; and reading the bit stream from the random access memory to obtain the target data.

In an embodiment of the present disclosure, the step of determining a target transmission mode from a bit value change transmission mode and a bit value fixed transmission mode includes:

acquiring a power-on frequency of the random access memory;

when the power-on frequency is an even number, determining the bit value change transmission mode as the target transmission mode; and when the power-on frequency is an odd number, determining the bit value fixed transmission mode as the target transmission mode.

In an embodiment of the present disclosure, the step of acquiring the power-on frequency of the random access memory includes:

acquiring the power-on frequency from an upper computer.

In an embodiment of the present disclosure, the step of acquiring target data to be stored in a fixed storage address in the random access memory includes:

acquiring model parameters of a deep learning model from the upper computer; and taking the model parameters as the target data.

Provided is a data storage apparatus, including:

a target data acquisition module configured to, after a random access memory is powered on, acquire target data to be stored in a fixed storage address in the random access memory;

a transmission mode determination module configured to determine a target transmission mode from a bit value change transmission mode and a bit value fixed transmission mode; the target transmission mode being different from a historical transmission mode determined after the random access memory is powered on last time; and a data transmission module configured to transmit the target data from and to the random access memory according to the target transmission mode.

Provided is a data storage device, including:

a memory configured to store a computer program; and a central processing unit configured to, when executing the computer program, implement the steps of the above-mentioned data storage method.

Provided is a readable storage medium, wherein the readable storage medium stores a computer program, and the computer program, when being executed by a central processing unit, implements the steps of the above-mentioned data storage method.

By applying the method provided in an embodiment of the present disclosure, after a random access memory is powered on, target data to be stored in a fixed storage address in the random access memory is acquired; a target transmission mode is determined from a bit value change transmission mode and a bit value fixed transmission mode; the target transmission mode is different from a historical transmission mode determined after the random access memory is powered on last time; and the target data is transmitted from and to the random access memory according to the target transmission mode.

In the present method, for the target data required to be fixedly stored in the fixed storage address in the random access memory, in order to avoid the insecurity of the target data stolen due to memory characteristics of the volatility. The transmission mode in which the target data is transmitted to the random access memory is firstly selected when the target data is stored by power-on. Transmission modes include the bit value change transmission mode and the bit value fixed transmission mode, wherein when the target data is transmitted in the bit value change transmission mode, the bit value in the bit stream of the target data may be modified; and when the target data is transmitted in the bit value fixed transmission mode, the bit stream of the target data may not be modified. By selecting the target transmission mode different from the transmission mode in which the target data is transmitted by power-on last time, and transmitting the target data from and to the random access memory according to the target transmission mode, it may be ensured that, when the target data is stored this time, there is a difference among bit values of the target data stored in the random access memory, the memory characteristics based on the random access memory are destroyed, and thus, a precondition of the target data is obtained. The target data may be prevented from being stolen after power-down, and the data security is guaranteed.

Accordingly, embodiments of the present disclosure further provide a data storage apparatus and device, and a readable storage medium, which correspond to the above-mentioned data storage method and have the above-mentioned technical effects, the descriptions thereof are omitted herein.

BRIEF DESCRIPTION OF THE DRAWINGS

The above description on the disclosed embodiments enables a person skilled in the art to implement or use the present disclosure. Various modifications on those embodiments will be apparent to a person skilled in the art, and the general principle defined herein may be implemented in other embodiments without departing from the spirit or scope of the present disclosure. Therefore, the present disclosure should not be limited to the embodiments illustrated herein, but should meet the broadest scope in accord with the principle and the novel characteristics disclosed herein.

DETAILED DESCRIPTION OF THE EMBODIMENTS

In the following, the technical solution of the embodiment of the present application will be clearly and completely described in combination with the drawings of the embodiment of the present application. Obviously, the embodiment described is only a part of the embodiments of the present application, not the whole embodiments. Based on the embodiments in the present application, all other embodiments obtained by a person of ordinary skill in the art without making creative labor belong to the scope of protection of the present application.

Figure 1:
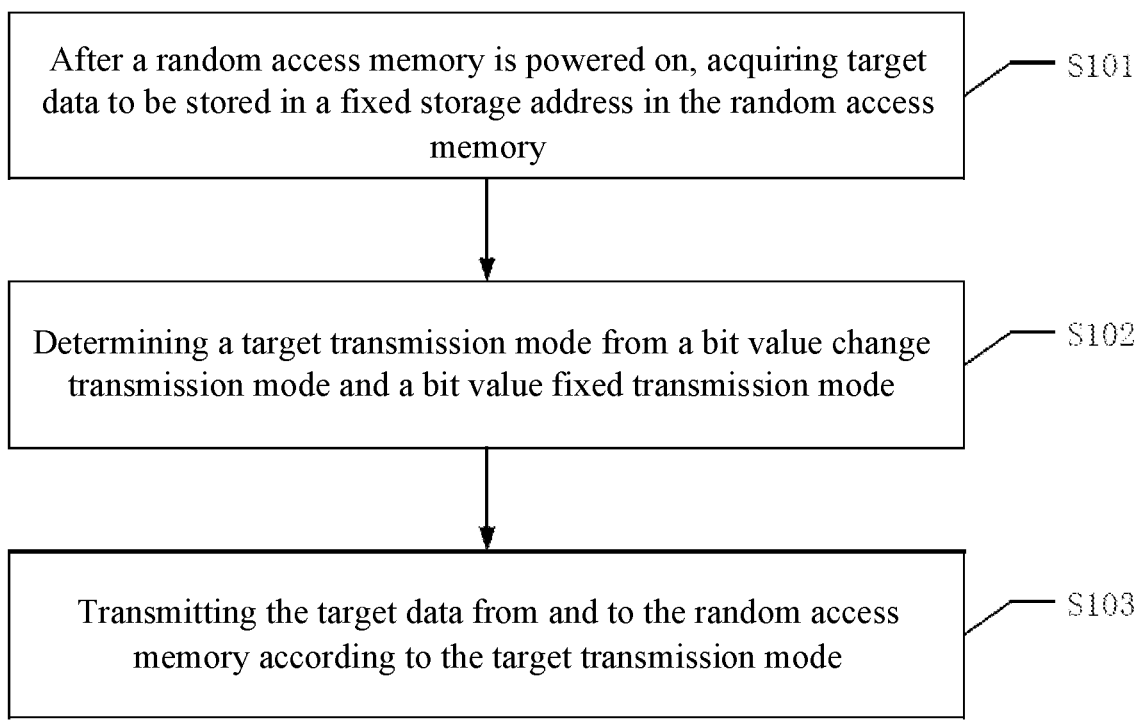
FIG. 1 is a flow chart showing the implementation of a data storage method in an embodiment of the present disclosure.

Please refer to FIG. 1 which is a flow chart showing the implementation of a data storage method in an embodiment of the present disclosure, the method includes the following steps:

S101, after a random access memory is powered on, target data to be stored in a fixed storage address in the random access memory is acquired.

A random access memory (RAM for short), is usually used to store and save data and is used as an operating system or other temporary storage medium on which a program is running.

The target data is changeless data stored in the fixed storage address in the random access memory for a long time. The target data may be data high in security requirement and high in using frequency, such as model parameters of a deep learning model or configuration parameters in an important system.

After the random access memory is powered on, the target data required to be stored may be acquired.

S102, a target transmission mode is determined from a bit value change transmission mode and a bit value fixed transmission mode.

The target transmission mode is different from a historical transmission mode determined after the random access memory is powered on last time.

When being stored in a readable storage medium, the data is frequently stored according to bits, that is, potentials corresponding to "1" and "0" are stored in the storage medium. In the present embodiment, in order to make the same data stored on a fixed position in the same random access memory within different periods of time (herein, one-time power-on refers to a period of time, of course, other periods of times may also be adopted), the potentials are changed, and thus, the situation that the data is stolen due to the memory characteristics of the random access memory is avoided.

When the target data is transmitted in the bit value change transmission model, a bit value in a bit stream of the target data is changed to be different from the bit stream of the target data (that is, the bit value on the same storage position is flipped, including that "1" is changed to "0", and "0" is changed to "1"); and when the bit value fixed transmission model is adopted, that is, the bit stream of the target data is transmitted, the bit value in the bit stream is unchanged. Therefore, by adopting the different transmission modes during power-on alternately, the situation that all bits corresponding to the target data generate memory characteristics may not occur even if the same data is stored in the random access memory, and thus, the data may be prevented from being stolen.

There are various ways in the bit value change transmission mode, and one or more ways may be set in an actual application.

The target transmission mode may be determined in a way that the transmission mode after power-on every time is recorded, and then, the target transmission mode for the target data after power-on this time is rapidly determined.

Which transmission mode to be adopted may also be determined by recording a power-on frequency and distinguishing whether the power-on frequency is an odd number or even number. An implementation process includes:

step 1, a power-on frequency of the random access memory is acquired;

step 2, when the power-on frequency is an even number, the bit value change transmission mode is determined as the target transmission mode; and step 3, when the power-on frequency is an odd number, the bit value fixed transmission mode is determined as the target transmission mode.

For facilitating description, the above-mentioned three steps will be combined for description as below.

The power-on frequency may be recorded by an upper computer (e.g. a CPU), that is, above step 1 may be that the power-on frequency is acquired from the upper computer.

It should be noted that, in the above-mentioned steps, the power-on frequency which is the even number is in one-to-one correspondence to the bit value change transmission mode, and the power-on frequency which is the odd number is in one-to-one correspondence to the bit value fixed transmission mode. In an actual application, the correspondence may also be changed, for example, the power-on frequency which is the odd number is in one-to-one correspondence to the bit value change transmission mode, and the power-on frequency which is the even number is in one-to-one correspondence to the bit value fixed transmission mode.

S103, the target data is transmitted from and to the random access memory according to the target transmission mode.

After the target transmission mode is determined, the target data may be transmitted from and to the random access memory according to the target transmission mode. That is, the target data is transmitted to the random access memory, and the target data is read from the random access memory.

Based on the different target transmission modes, mutual transmission modes for the target data include, but are not limited to the following situations:

Situation 1: when the target transmission mode is the bit value change transmission mode, the transmission process of the target data includes:

step 1, bit flipping is performed on a bit value of the target data to obtain a flipped bit stream corresponding to the target data;

step 2, the flipped bit stream is transmitted to the random access memory;

step 3, the flipped bit stream is read from the random access memory; and step 4, bit flipping is performed on the flipped bit stream to obtain the target data.

The bit flipping for the bit value of the target data is the reversion for the target data in a binary form, that is, "1" is flipped into "0", and "0" is flipped into "1". It should be noted that, when the bit value of the target data is flipped, all the bits may be flipped, or parts of bits may be flipped according to a certain rule, for example, the bits are flipped at one or more intervals.

The flipped bit stream is obtained after flipping, the flipped bit stream is directly stored in the random access memory, then, corresponding flipping is also required after the flipped bit stream is directly read from the random access memory, and thus, the target data is obtained.

Situation 2: when the target transmission mode is the bit value change transmission mode, the transmission process of the target data includes:

step 1, shift processing is performed on the bit stream of the target data to obtain a shifted bit stream corresponding to the target data;

step 2, the shifted bit stream is transmitted to the random access memory;

step 3, the shifted bit stream is read from the random access memory; and step 4, shift recovery is performed on the shifted bit stream to obtain the target data.

For example, when the bit stream of the target data is "10101010", the first position of the bit stream "10101010" may be shifted to the tail position, then, other positions are forwards shifted in sequence to obtain a bit stream "01010101". Thus, the bit values of the bits are changed before and after shifting. Of course, after the shifted bit stream is read from the random access memory, shift recovery is performed on the shifted bit stream, that is, reverse shifting is performed on the shifted bit stream to obtain the target data.

Situation 3: when the target transmission mode is the bit value fixed transmission mode, the transmission process of the target data includes:

step 1, the bit stream of the target data is transmitted to the random access memory; and step 2, the bit stream is read from the random access memory to obtain the target data.

For transmission modes in which the bit value is unchanged, namely direct transmission for the target data, changeable operations are not needed before and after transmission.

By applying the method provided in the embodiment of the present disclosure, after a random access memory is powered on, target data to be stored in a fixed storage address in the random access memory is acquired; a target transmission mode is determined from a bit value change transmission mode and a bit value fixed transmission mode; the target transmission mode is different from a historical transmission mode determined after the random access memory is powered on last time; and the target data is transmitted from and to the random access memory according to the target transmission mode.

In the present method, for the target data required to be fixedly stored in the fixed storage address in the random access memory, in order to avoid the insecurity of the target data stolen due to memory characteristics of the volatility. The transmission mode in which the target data is transmitted to the random access memory is firstly selected when the target data is stored by power-on. Transmission modes include the bit value change transmission mode and the bit value fixed transmission mode, wherein when the target data is transmitted in the bit value change transmission mode, the bit value in the bit stream of the target data may be modified; and when the target data is transmitted in the bit value fixed transmission mode, the bit stream of the target data may not be modified. By selecting the target transmission mode different from the transmission mode in which the target data is transmitted by power-on last time, and transmitting the target data from and to the random access memory according to the target transmission mode, it may be ensured that, when the target data is stored this time, there is a difference among bit values of the target data stored in the random access memory, the memory characteristics based on the random access memory are destroyed, and thus, a precondition of the target data is obtained. The target data may be prevented from being stolen after power-down, and the data security is guaranteed.

It should be noted that, an embodiment of the present disclosure further provides a corresponding improved solution based on the above-mentioned embodiment. The steps which are involved to an optimized/improved embodiment and are the same as or corresponding to the steps in the above-mentioned embodiment may refer to each other, the corresponding beneficial effects may also refer to each other, and they will not be repeated one by one in the optimized/improved embodiment.

In an embodiment of the present disclosure, the target data may be model parameters of a deep learning model, and thus, the deep learning model may be protected. That is, above step S101 may include:

step 1, model parameters of a deep learning model are acquired from the upper computer; and step 2, the model parameters are taken as the target data.

For facilitating understanding, the data storage method will be described below for a application scenario of the model parameters of the deep learning model stored in the random access memory.

In the field of deep learning, the deep learning model is suitable for complicated mode recognition, is required to be trained by using a great number of samples and expensive machines and is a high-value asset, and therefore, the trained model is required to be protected. In an inference application scenario, the parameters of the deep learning model may be stored in the fixed address space of the random access memory for a long time and may remain unchanged for a long time. The random access memory may accumulatively generate certain memory characteristics when storing the fixed model and the parameters thereof for a long time, which may cause the high-value inference model to be illegally copied and read. By adopting the data storage method provided in the embodiment of the present disclosure, i.e. constructing a regular flipping method for eliminating the memory characteristics of the random access memory, the data of the deep learning model may be better protected from being illegally copied.

At present, the deep learning model has mainly run on two hardware architecture including a Graphics Processing Unit (GPU) and a Field Programmable Gate Array (FPGA). In an ordinary FPGA solution, an architecture of a hard disk+ CPU+FPGA+ Double Data Rate (DDR, Synchronous Dynamic Random Access Memory with Double Data Rate) is adopted, and under the condition of power-down, the model parameters are generally stored in a non-random access memory (such as a mechanical hard disk, a Serial Advanced Technology Attachment (SATA) disk, and a Non-random access memory express (NVME) disk) on a CPU side; and after power-on, generally, the model data may not be cracked on the software level due to the encipherment protection of software, in order to achieve the rapid calculation (convolution, a fully-connected network, etc.) of the FPGA, the model parameters will be stored in the DDR on the FPGA side in a way of a plain code, a program of the FPGA has an encryption function so as not to be cracked generally, and after the random access memory is in power-down, the model parameters should also be lost according to the characteristic of volatility, and there should not be a risk that the model parameters are stolen.

However, a model and parameters of an inference device may not be easily changed and may be stored in a certain segment of fixed address space of the random access memory for a long time after the device is powered on, and after the data is operated for thousands of hours, the system characteristic of the random access memory may be inclined to remember electrical level values of these model data. If the DDR is not operated by the CPU, it is easy to change the random access memory to the original state of long-term storage under the influence from an electrical design principle of the random access memory even if the random access memory is powered on after power-down. Therefore, there is a risk that the model data stored in the random access memory is lost, then, property loss is caused, and the leading superiorities of relevant technologies are lost.

In order to reduce the risk that the above-mentioned model data is lost, the elimination of the memory characteristics of the random access memory is very important. Before power-down, the memory characteristics generated when the random access memory remaining the same data for a long time may not be effectively eliminated even if relevant data in the random access memory is cleared firstly, then, power-down is performed, and the random access memory still has certain memory characteristics after being repowered on.

Figure 2:
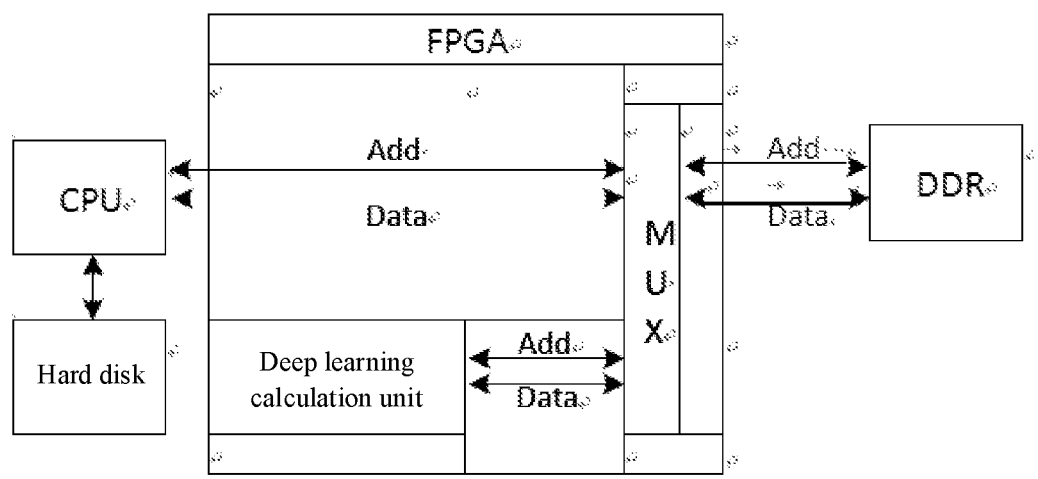
FIG. 2 is a schematic diagram showing a hardware architecture of an inference deep learning model based on a FPGA.

An inference deep learning model based on a FPGA is shown in FIG. 2. After power-on, the encrypted model data in a hard disk is downloaded into the DDR on the FPGA side by software running in the CPU, then, deep learning calculation is performed by the FPGA by extracting data on a DDR address, and a calculation result is put into the DDR so as to be read by the CPU.

The relevant model parameters for deep learning may be downloaded into a fixed address area of the DDR after power-on, the model parameters which have been trained and are not required to be modified are used due to inference calculation, and therefore, in this address area, the value of the DDR may remain unchanged for a long time. Due to the long-term action of an electric stress, a thermal effect, electro migration, etc., voltage thresholds on relevant positions of the DDR are changed, physical accumulation may be caused by the relevant change under the long-term action, and thus, the random access memory such as the DDR has a certain memory effect; and even if the CPU is powered on after power-down, it may not operate the DDR, the DDR may still recover the previous data, and there may also be a security risk in the model parameters.

Figure 3:
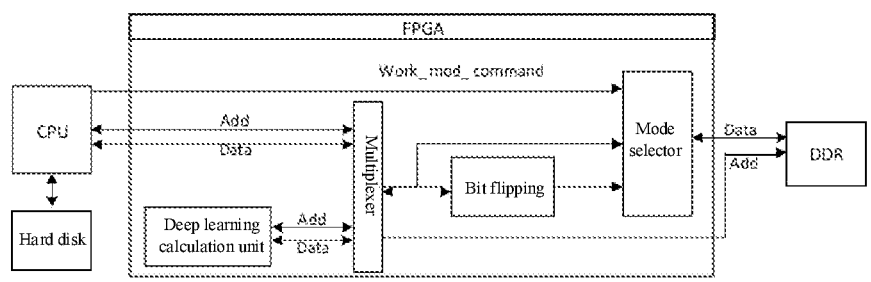
FIG. 3 is a schematic diagram showing the implementation of a data storage method in an embodiment of the present disclosure.

By adopting the data storage method provided in the embodiment of the present disclosure, the frequency that 0 and 1 are written into the same address space of the DDR may be effectively balanced, the probability that the DDR generates the memory effect may be reduced, and thus, the purpose of protecting the model data is achieved. A system frame is shown in FIG. 3.

Figure 4:
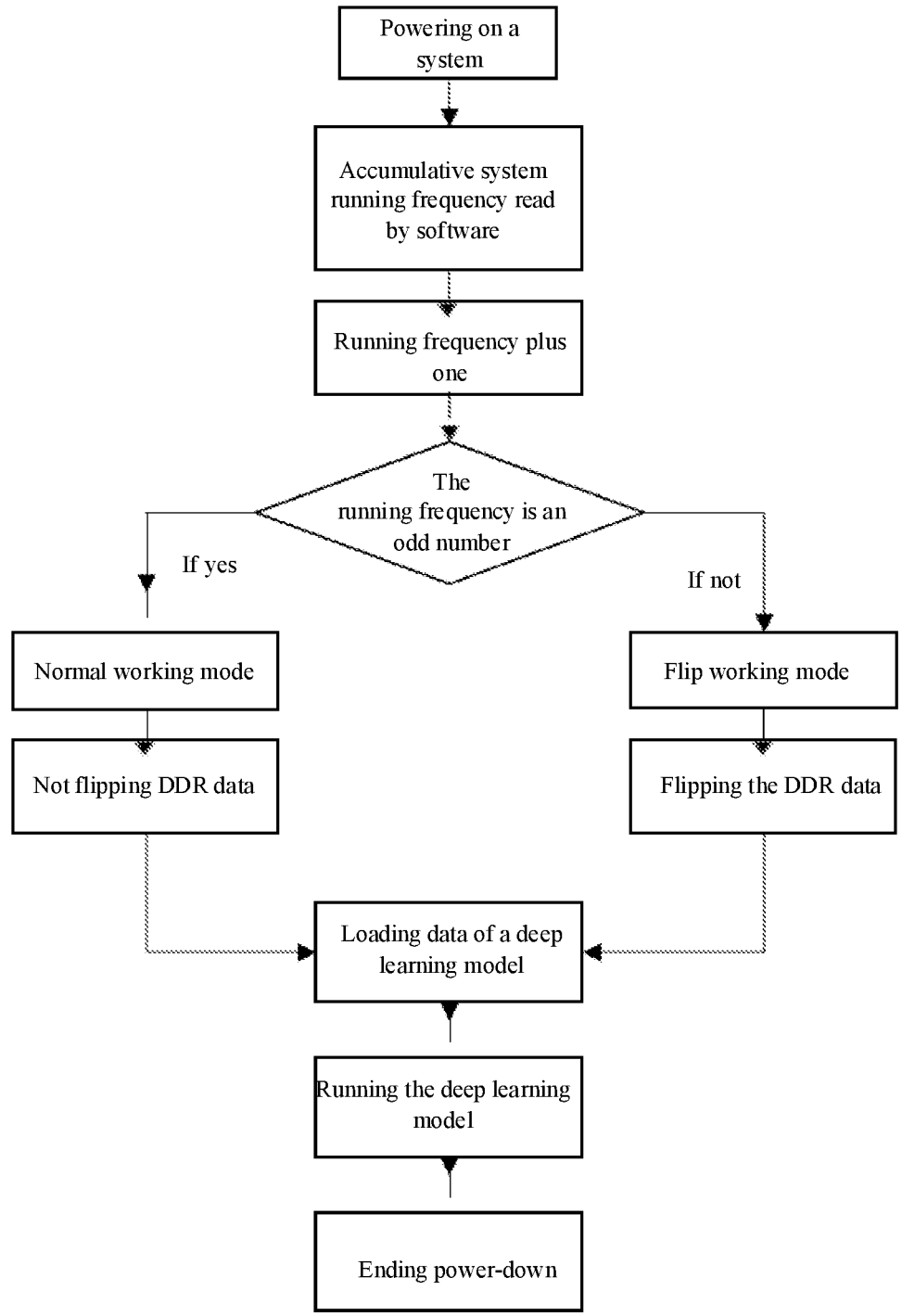
FIG. 4 is a flow chart showing the implementation of a data storage method in an embodiment of the present disclosure.

The flow chart showing the implementation is shown in FIG. 4. The implementation process includes:

S1: a CPU software side records a starting frequency of a device on a hard disk. A counter may add one every time when software runs after power-on;

S2: the software issues a working mode to the FPGA according to the starting frequency (divided into an odd number and an even number) this time, wherein a normal working mode is transmitted when the starting frequency is the odd number, and a flip working mode is transmitted when the starting frequency is the even number;

S3: a mode selector on the FPGA side performs working mode selection on a bidirectional data interface between the FPGA and the DDR after receiving a working mode command word of the CPU;

S4: when the FPGA works in the normal working mode, the FPGA does not perform any processing on the reading and writing data of the DDR. The reading and writing data of the DDR is completely consistent with the data on the CPU side; and S5: when the FPGA works in the flip working mode, the FPGA may perform bit flipping (for example, a not gate is achieved by lut) before writing the data into the DDR; and the FPGA also performs bit flipping on the data before reading the DDR data to the CPU or a deep learning unit. It may be ensured that the data is correctly analyzed by a calculation unit, and meanwhile, the values of 0 and 1 are also written into the same address space of the DDR equiprobably and evenly. It is ensured that the writing frequencies of 0 and 1 are approximately identical on the same physical position.

Thus, it may be seen that, by adopting an evenly-written data flipping strategy, the memory characteristic of the random access memory may be effectively eliminated, the risk that the model data is leaked may be reduced, the high-value deep learning model may be effectively protected, the data asset may be protected, and the technical leadership is maintained.

In correspondence to the above-mentioned method embodiment, an embodiment of the present disclosure further provides a data storage apparatus, and the data storage apparatus described hereinafter and the data storage method described above may correspondingly refer to each other.

Figure 5:
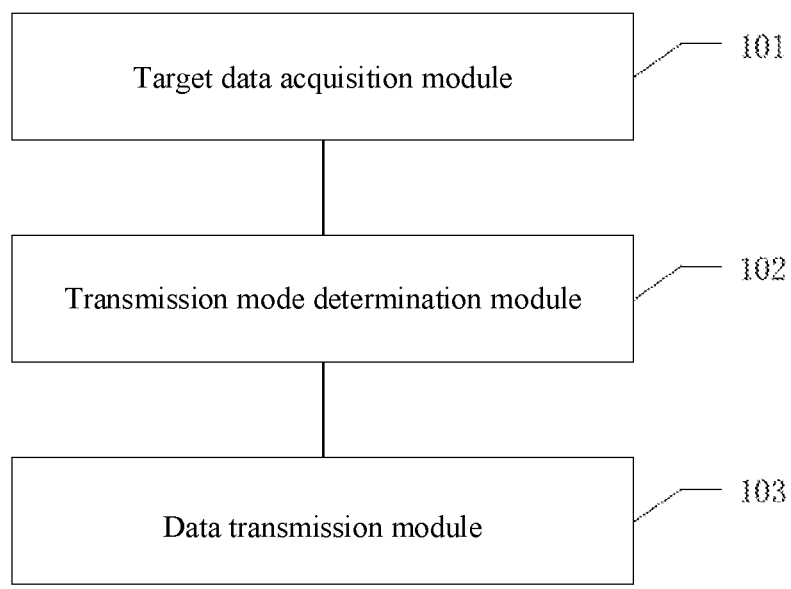
FIG. 5 is a schematic diagram showing a structure of a data storage apparatus in an embodiment of the present disclosure.

Refer to FIG. 5, the apparatus includes the following modules:

a target data acquisition module 101 configured to, after a random access memory is powered on, acquire target data to be stored in a fixed storage address in the random access memory;

a transmission mode determination module 102 configured to determine a target transmission mode from a bit value change transmission mode and a bit value fixed transmission mode; the target transmission mode being different from a historical transmission mode determined after the random access memory is powered on last time; and a data transmission module 103 configured to transmit the target data from and to the random access memory according to the target transmission mode.

By applying the apparatus provided in an embodiment of the present disclosure, after a random access memory is powered on, target data to be stored in a fixed storage address in the random access memory is acquired; a target transmission mode is determined from a bit value change transmission mode and a bit value fixed transmission mode; the target transmission mode is different from a historical transmission mode determined after the random access memory is powered on last time; and the target data is transmitted from and to the random access memory according to the target transmission mode.

In the present apparatus, for the target data required to be fixedly stored in the fixed storage address in the random access memory, in order to avoid the insecurity of the target data stolen due to memory characteristics of the volatility. The transmission mode in which the target data is transmitted to the random access memory is firstly selected when the target data is stored by power-on. Transmission modes include the bit value change transmission mode and the bit value fixed transmission mode, wherein when the target data is transmitted in the bit value change transmission mode, the bit value in the bit stream of the target data may be modified; and when the target data is transmitted in the bit value fixed transmission mode, the bit stream of the target data may not be modified. By selecting the target transmission mode different from the transmission mode in which the target data is transmitted by power-on last time, and transmitting the target data from and to the random access memory according to the target transmission mode, it may be ensured that, when the target data is stored this time, there is a difference among bit values of the target data stored in the random access memory, the memory characteristics based on the random access memory are destroyed, and thus, a precondition of the target data is obtained. The target data may be prevented from being stolen after power-down, and the data security is guaranteed.

In an implementation of the present disclosure, when the target transmission mode is the bit value change transmission mode, the data transmission module 103 is configured to perform bit flipping on a bit value of the target data to obtain a flipped bit stream corresponding to the target data; transmit the flipped bit stream to the random access memory; read the flipped bit stream from the random access memory; and perform bit flipping on the flipped bit stream to obtain the target data.

In an implementation of the present disclosure, when the target transmission mode is the bit value change transmission mode, the data transmission module 103 is configured to perform shift processing on the bit stream of the target data to obtain a shifted bit stream corresponding to the target data; transmit the shifted bit stream to the random access memory; read the shifted bit stream from the random access memory; and perform shift recovery on the shifted bit stream to obtain the target data.

In an implementation of the present disclosure, when the target transmission mode is the bit value fixed transmission mode, the data transmission module 103 is configured to transmit the bit stream of the target data to the random access memory; and read the bit stream from the random access memory to obtain the target data.

In an implementation of the present disclosure, the transmission mode determination module 102 is configured to acquire a power-on frequency of the random access memory; when the power-on frequency is an even number, determine the bit value change transmission mode as the target transmission mode; and when the power-on frequency is an odd number, determine the bit value fixed transmission mode as the target transmission mode.

In an implementation of the present disclosure, the transmission mode determination module 102 is configured to acquire the power-on frequency from an upper computer.

In an implementation of the present disclosure, the target data acquisition module 101 is configured to acquire model parameters of a deep learning model from the upper computer; and take the model parameters as the target data.

In correspondence to the above-mentioned method embodiment, an embodiment of the present disclosure further provides a data storage device, and the data storage device described hereinafter and the data storage method described above may correspondingly refer to each other.

Figure 6:
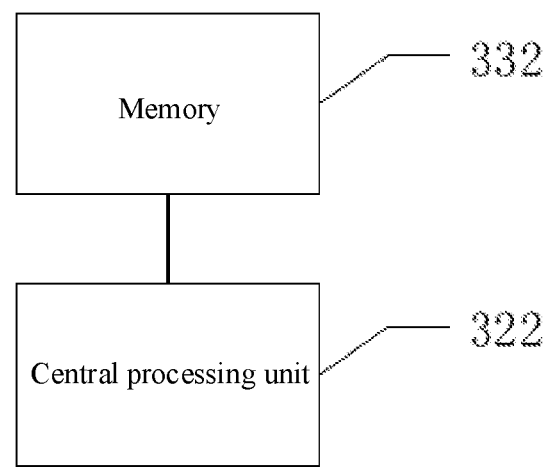
FIG. 6 is a schematic diagram showing a structure of a data storage device in an embodiment of the present disclosure.

Refer to FIG. 6, the data storage device includes:

a memory 332 configured to store a computer program; and a central processing unit 322 configured to, when executing the computer program, implement the steps of the data storage method in the above-mentioned method embodiment.

Figure 7:
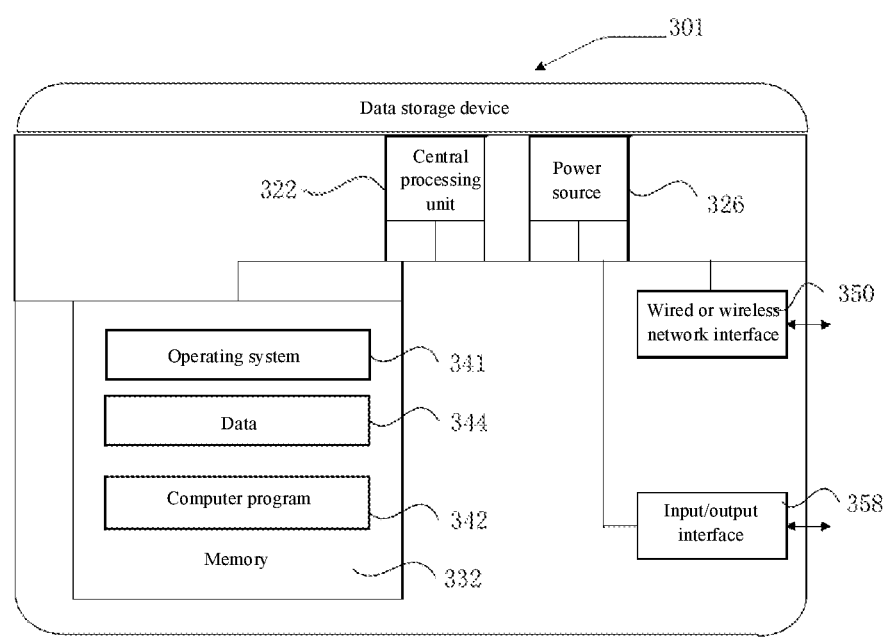
FIG. 7 is a schematic diagram showing a structure of a data storage device in an embodiment of the present disclosure.

In an embodiment, please refer to FIG. 7 which is a schematic diagram showing a structure of a data storage device in an embodiment of the present disclosure, the data storage device may generate great differences due to different configurations or performances and may include one or more central processing units (CPU) 322 (such as one or more central processing units) and a memory 332, and the memory 332 stores one or more computer applications 342 or data 344. The memory 332 may perform temporary storage or permanent storage. A program stored in the memory 332 may include one or more modules (unshown in the figures), and each of the modules may include a series of instruction operations in a data processing device. Furthermore, the central processing unit 322 may be configured to be in communication with the memory 332 and perform a series of instruction operations in the memory 332 on a data storage device 301.

The data storage device 301 may further include one or more power sources 326, one or more wired or wireless network interfaces 350, one or more input/output interfaces 358, and/or one or more operating systems 341.

The steps in the data storage method described above may be implemented by the structure of the data storage device.

In correspondence to the above-mentioned method embodiment, an embodiment of the present disclosure further provides a readable storage medium, and the readable storage medium described hereinafter and the data storage method described above may correspondingly refer to each other.

Provided is a readable storage medium, wherein the readable storage medium stores a computer program, and the computer program, when being executed by a central processing unit, implements the steps of the data storage method in the above-mentioned method embodiment.

The readable storage medium may be various readable storage media, such as a U disk, a mobile hard disk, a read-only memory (ROM), a random access memory (RAM), and a diskette or optical disk, capable of storing a program code.

A person skilled in the art may further realize that the units and algorithm steps of each example described in combination with the examples disclosed herein may be realized by electronic hardware, computer software or a combination of the two. In order to clearly explain the interchangeability of hardware and software, the composition and steps of each example have been described generally according to the functions in the above instructions. Whether these functions are implemented in hardware or software depends on the specific application and design constraints of the technical solution. A person skilled in the art may use different methods to implement the described functions for each specific application, but this implementation should not be considered beyond the scope of the invention.

The invention claimed is:

1. A data storage method, comprising:
after a random access memory is powered on, acquiring target data to be stored in a fixed storage address in the random access memory;
determining a target transmission mode from a bit value change transmission mode and a bit value fixed transmission mode; the target transmission mode being different from a historical transmission mode determined after the random access memory is powered on last time; and
transmitting the target data from and to the random access memory according to the target transmission mode;
wherein the step of determining the target transmission mode from the bit value change transmission mode and the bit value fixed transmission mode comprises:
acquiring a power-on frequency of the random access memory;
when the power-on frequency is an even number, determining the bit value change transmission mode as the target transmission mode; and
when the power-on frequency is an odd number, determining the bit value fixed transmission mode as the target transmission mode.

2. The data storage method according to claim 1, wherein when the target transmission mode is the bit value change transmission mode, the step of transmitting the target data from and to the random access memory according to the target transmission mode comprises:
performing bit flipping on a bit value of the target data to obtain a flipped bit stream corresponding to the target data;
transmitting the flipped bit stream to the random access memory;
reading the flipped bit stream from the random access memory; and
performing bit flipping on the flipped bit stream to obtain the target data.

3. The data storage method according to claim 1, wherein when the target transmission mode is the bit value change transmission mode, the step of transmitting the target data from and to the random access memory according to the target transmission mode comprises:
performing shift processing on the bit stream of the target data to obtain a shifted bit stream corresponding to the target data;

transmitting the shifted bit stream to the random access memory;
reading the shifted bit stream from the random access memory; and
performing shift recovery on the shifted bit stream to obtain the target data.

4. The data storage method according to claim 1, wherein when the target transmission mode is the bit value fixed transmission mode, the step of transmitting the target data from and to the random access memory according to the target transmission mode comprises:
transmitting the bit stream of the target data to the random access memory; and
reading the bit stream from the random access memory to obtain the target data.

5. The data storage method according to claim 1, wherein the step of acquiring the power-on frequency of the random access memory comprises:
acquiring the power-on frequency from an upper computer.

6. The data storage method according to claim 1, wherein the step of acquiring target data to be stored in a fixed storage address in the random access memory comprises:
acquiring model parameters of a deep learning model from the upper computer; and
taking the model parameters as the target data.

7. A data storage device, comprising:
a memory configured to store a computer program; and
a processor configured to, when executing the computer program, implement operations as follows:
after a random access memory is powered on, acquiring target data to be stored in a fixed storage address in the random access memory;
determining a target transmission mode from a bit value change transmission mode and a bit value fixed transmission mode; the target transmission mode being different from a historical transmission mode determined after the random access memory is powered on last time; and
transmitting the target data from and to the random access memory according to the target transmission mode;
wherein the step of determining the target transmission mode from the bit value change transmission mode and the bit value fixed transmission mode comprises:
acquiring a power-on frequency of the random access memory;
when the power-on frequency is an even number, determining the bit value change transmission mode as the target transmission mode; and
when the power-on frequency is an odd number, determining the bit value fixed transmission mode as the target transmission mode.

8. A non-transitory computer-readable storage medium, storing a computer program that is executed executable by a processor, and upon execution by the processor, is configured to cause the processor to implement operations as follows:
after a random access memory is powered on, acquiring target data to be stored in a fixed storage address in the random access memory;
determining a target transmission mode from a bit value change transmission mode and a bit value fixed transmission mode; the target transmission mode being different from a historical transmission mode determined after the random access memory is powered on last time; and
transmitting the target data from and to the random access memory according to the target transmission mode;
wherein the step of determining the target transmission mode from the bit value change transmission mode and the bit value fixed transmission mode comprises:
acquiring a power-on frequency of the random access memory;
when the power-on frequency is an even number, determining the bit value change transmission mode as the target transmission mode; and
when the power-on frequency is an odd number, determining the bit value fixed transmission mode as the target transmission mode.

9. The device according to claim 7, wherein when the target transmission mode is the bit value change transmission mode, the step of transmitting the target data from and to the random access memory according to the target transmission mode comprises:
performing bit flipping on a bit value of the target data to obtain a flipped bit stream corresponding to the target data;
transmitting the flipped bit stream to the random access memory;
reading the flipped bit stream from the random access memory; and
performing bit flipping on the flipped bit stream to obtain the target data.

10. The device according to claim 7, wherein when the target transmission mode is the bit value change transmission mode, the step of transmitting the target data from and to the random access memory according to the target transmission mode comprises:
performing shift processing on the bit stream of the target data to obtain a shifted bit stream corresponding to the target data;
transmitting the shifted bit stream to the random access memory;
reading the shifted bit stream from the random access memory; and
performing shift recovery on the shifted bit stream to obtain the target data.

11. The device according to claim 7, wherein when the target transmission mode is the bit value fixed transmission mode, the step of transmitting the target data from and to the random access memory according to the target transmission mode comprises:
transmitting the bit stream of the target data to the random access memory; and
reading the bit stream from the random access memory to obtain the target data.

12. The device according to claim 7, wherein the step of acquiring the power-on frequency of the random access memory comprises:
acquiring the power-on frequency from an upper computer.

13. The device according to claim 7, wherein the step of acquiring target data to be stored in a fixed storage address in the random access memory comprises:
acquiring model parameters of a deep learning model from the upper computer; and
taking the model parameters as the target data.

14. The medium according to claim 8, wherein when the target transmission mode is the bit value change transmission mode, the step of transmitting the target data from and to the random access memory according to the target transmission mode comprises:

performing bit flipping on a bit value of the target data to obtain a flipped bit stream corresponding to the target data;

transmitting the flipped bit stream to the random access memory;

reading the flipped bit stream from the random access memory; and performing bit flipping on the flipped bit stream to obtain the target data.

15. The medium according to claim 8, wherein when the target transmission mode is the bit value change transmission mode, the step of transmitting the target data from and to the random access memory according to the target transmission mode comprises:

performing shift processing on the bit stream of the target data to obtain a shifted bit stream corresponding to the target data;

transmitting the shifted bit stream to the random access memory;

reading the shifted bit stream from the random access memory; and performing shift recovery on the shifted bit stream to obtain the target data.

16. The medium according to claim 8, wherein when the target transmission mode is the bit value fixed transmission mode, the step of transmitting the target data from and to the random access memory according to the target transmission mode comprises:

transmitting the bit stream of the target data to the random access memory; and reading the bit stream from the random access memory to obtain the target data.

17. The medium according to claim 8, wherein the step of acquiring target data to be stored in a fixed storage address in the random access memory comprises:

acquiring model parameters of a deep learning model from the upper computer; and taking the model parameters as the target data.

* * * * *